United States Patent
Rubinstein et al.

(10) Patent No.: US 11,050,948 B2
(45) Date of Patent: *Jun. 29, 2021

(54) TAKING PHOTOS THROUGH VISUAL OBSTRUCTIONS

(71) Applicant: Google LLC, Mountain View, CA (US)

(72) Inventors: Michael Rubinstein, Mountain View, CA (US); William Freeman, Mountain View, CA (US); Ce Liu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/526,343

(22) Filed: Oct. 21, 2019

(65) Prior Publication Data

US 2020/0036908 A1    Jan. 30, 2020

Related U.S. Application Data

(63) Continuation of application No. 15/392,452, filed on Dec. 28, 2016, now Pat. No. 10,412,316.

(Continued)

(51) Int. Cl.
*H04N 5/262* (2006.01)
*G06T 5/00* (2006.01)
(Continued)

(52) U.S. Cl.
CPC .......... *H04N 5/2621* (2013.01); *G06T 5/001* (2013.01); *G06T 5/005* (2013.01); *G06T 5/20* (2013.01);
(Continued)

(58) Field of Classification Search
CPC .......... H04N 5/2621; H04N 5/232945; H04N 5/2226; H04N 5/23222; H04N 5/23293;
(Continued)

(56) References Cited

U.S. PATENT DOCUMENTS 6,272,244 B1 * 8/2001 Takahashi ............ G06K 9/3258
382/190
6,404,901 B1 * 6/2002 Itokawa .................. G06T 7/223
382/103
(Continued)

FOREIGN PATENT DOCUMENTS

EP          2958316         12/2015
JP       2010-041586         2/2010
(Continued)

OTHER PUBLICATIONS

European Patent Office, Supplementary European Search Report dated Jun. 18, 2019, issued in connection with European Patent Application No. 16904835, 7 pages.

(Continued)

*Primary Examiner* — Lin Ye
*Assistant Examiner* — John H Morehead, III
(74) *Attorney, Agent, or Firm* — McDonnell Boehnen Hulbert & Berghoff LLP

(57) ABSTRACT

The present disclosure relates to systems and methods for image capture. Namely, an image capture system may include a camera configured to capture images of a field of view, a display, and a controller. An initial image of the field of view from an initial camera pose may be captured. An obstruction may be determined to be observable in the field of view. Based on the obstruction, at least one desired camera pose may be determined. The at least one desired camera pose includes at least one desired position of the camera. A capture interface may be displayed, which may include instructions for moving the camera to the at least one desired camera pose. At least one further image of the field of view from the at least one desired camera pose may be captured. Captured images may be processed to remove the obstruction from a background image.

20 Claims, 10 Drawing Sheets

Related U.S. Application Data

(60) Provisional application No. 62/348,118, filed on Jun. 9, 2016.

(51) Int. Cl.
    *H04N 5/222*     (2006.01)
    *H04N 5/232*     (2006.01)
    *G06T 5/50*     (2006.01)
    *G06T 7/30*     (2017.01)
    *G06T 7/90*     (2017.01)
    *G06T 5/20*     (2006.01)

(52) U.S. Cl.
CPC ............... *G06T 5/50* (2013.01); *G06T 7/30* (2017.01); *G06T 7/90* (2017.01); *H04N 5/2226* (2013.01); *H04N 5/232945* (2018.08); *G06T 2207/10004* (2013.01); *G06T 2207/10024* (2013.01); *G06T 2207/20024* (2013.01); *G06T 2207/20092* (2013.01); *G06T 2207/20221* (2013.01); *G06T 2207/30244* (2013.01); *H04N 5/23222* (2013.01); *H04N 5/23293* (2013.01)

(58) Field of Classification Search
CPC .......... H04N 5/262; H04N 5/77; G06T 5/005; G06T 5/50; G06T 5/20; G06T 5/001; G06T 7/30; G06T 7/90; G06T 7/194; G06T 2207/20092; G06T 2207/2207; G06T 2207/20221; G06T 2207/10004; G06T 2207/10024; G06T 2207/20024; G06T 2207/30244
See application file for complete search history.

(56) References Cited

U.S. PATENT DOCUMENTS

| | | | | |
|---|---|---|---|---|
| 8,259,161 B1* | 9/2012 | Huang | .................. | G03B 35/02 348/50 |
| 8,659,667 B2* | 2/2014 | Syed | ................. | H04N 1/00137 348/207.1 |
| 8,964,025 B2* | 2/2015 | Cudak | ................ | H04N 5/23218 348/135 |
| 2006/0284976 A1* | 12/2006 | Girgensohn | .......... | G06F 16/786 348/135 |
| 2008/0279422 A1* | 11/2008 | Matsuzawa | ............... | G06T 5/50 382/106 |
| 2010/0035682 A1* | 2/2010 | Gentile | .................. | H04N 5/272 463/30 |
| 2010/0165119 A1 | 7/2010 | Tang et al. | | |
| 2010/0194972 A1* | 8/2010 | Matsuzawa | ............ | G03B 13/18 348/349 |
| 2012/0262572 A1* | 10/2012 | Cudak | .................... | G06T 5/005 348/135 |
| 2014/0098194 A1* | 4/2014 | Goma | ....................... | G06T 7/85 348/47 |
| 2014/0267821 A1* | 9/2014 | Masuura | ................ | H04N 7/181 348/222.1 |
| 2015/0187056 A1* | 7/2015 | Nakamae | .................. | G06T 5/50 382/275 |
| 2015/0220789 A1 | 8/2015 | Wood et al. | | |
| 2016/0073035 A1 | 3/2016 | Yamamoto | | |

FOREIGN PATENT DOCUMENTS

| | | |
|---|---|---|
| JP | 2012-222495 | 11/2012 |
| JP | 2013-153321 | 8/2013 |
| JP | 2015-005925 | 1/2015 |
| WO | 2015/104236 | 7/2015 |

OTHER PUBLICATIONS

International Searching Authority, International Search Report and Written Opinion dated Mar. 16, 2017, issued in connection with International Patent Application No. PCT/US2016/068889, filed on Dec. 28, 2016, 13 pages.

\* cited by examiner

TAKING PHOTOS THROUGH VISUAL OBSTRUCTIONS

PRIORITY CLAIM

This application is continuation of U.S. patent application Ser. No. 15/392,452, filed Dec. 28, 2016, which claims priority to U.S. Provisional Patent Application No. 62/348,118 filed on Jun. 9, 2016, both of which are herein incorporated by reference herein in their entirety and for all purposes.

BACKGROUND

A field of view of a camera may include reflecting or occluding elements. In such scenarios, images captured by the camera may provide less desirable results than images that do not include such reflecting or occluding elements.

SUMMARY

Systems and methods disclosed herein relate to image capture systems and methods that may provide images without occluding or reflecting elements that might otherwise be captured via conventional image capture systems.

In an aspect, a system is provided. The system includes a camera configured to capture images of a field of view and a display. The system also includes a controller having at least one processor and a memory. The processor executes program instructions stored in the memory so as to carry out operations. The operations include causing the camera to capture an initial image of the field of view from an initial camera pose and determining that an obstruction is observable in the field of view. The operations include determining, based on the obstruction, at least one desired camera pose. The at least one desired camera pose includes at least one desired position of the camera. The operations include causing the display to provide a capture interface. The capture interface includes instructions corresponding to moving the camera to the at least one desired camera pose. The operations also include causing the camera to capture at least one further image of the field of view. The operations further include processing the captured images to provide at least one background image of the field of view. At least a portion of the obstruction is not present in the background image.

In an aspect, a method is provided. The method includes capturing, via a camera, an initial image of the field of view from an initial camera pose. The camera includes a display. The method includes determining that an obstruction is observable in the field of view. The method also includes determining, based on the obstruction, at least one desired camera pose. The at least one desired camera pose includes at least one desired position of the camera. The method further includes providing, via the display, a capture interface. The capture interface includes instructions corresponding to moving the camera to the at least one desired camera pose. The method yet further includes capturing, via the camera, at least one further image of the field of view. The method additionally includes processing the captured images to provide at least one background image of the field of view. At least a portion of the obstruction is not present in the background image.

In an aspect, a system is provided. The system includes various means for carrying out the operations of the other respective aspects described herein.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
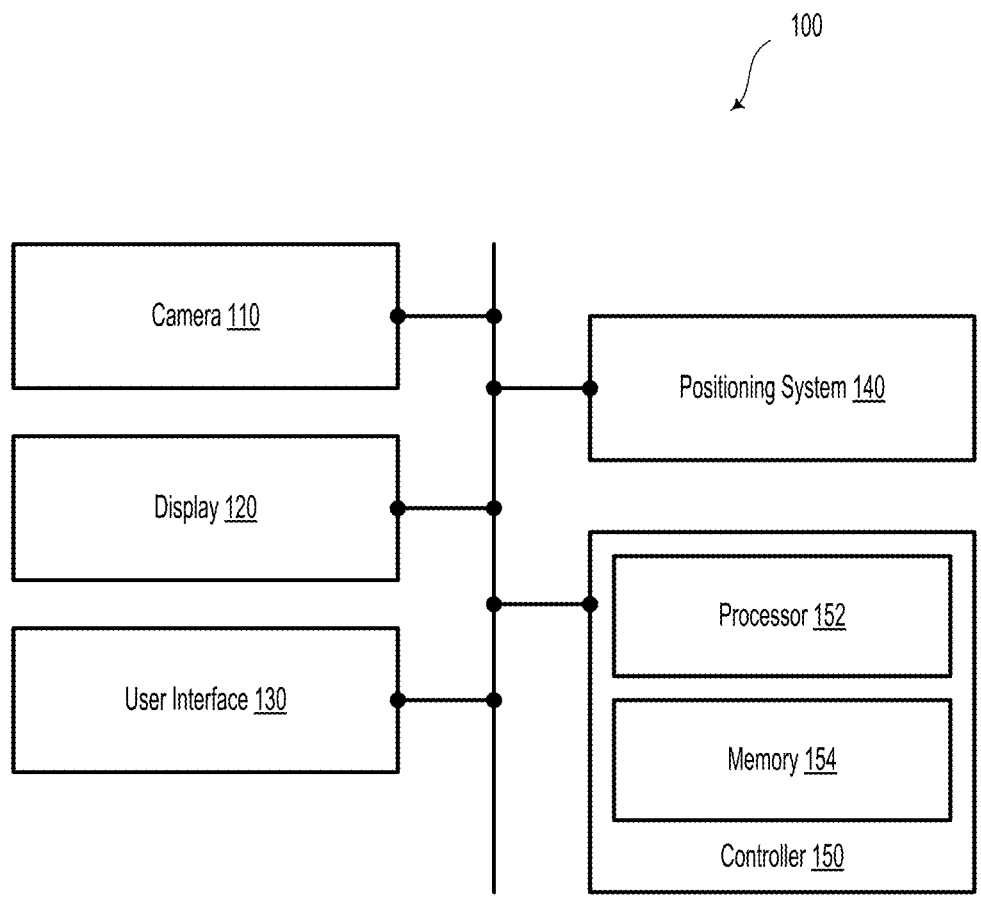
FIG. 1 illustrates a schematic diagram of a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Conventional image capture techniques may produce undesirable results when the field of view of a camera includes reflecting and/or occluding elements. For example, when taking pictures through glass windows toward a dark scene (e.g., at night), reflections from brightly lit indoor objects may wash out or otherwise degrade images of the background dark scene. As another example, photographing zoo animals through enclosures may provide less-than-desirable results due to occluding objects such as cage bars or fences.

In an example embodiment, systems and methods described herein may be applied in the context of removing occluding elements in the foreground of an image. As a non-limiting example, occluding elements may include poles, fences, bars, screens, raindrops on a window, or other elements that may be observable in the foreground of a field of view of a camera. In an example embodiment, various image processing algorithms may be applied to images captured at different camera positions so as to restore the scene so that it is free of visual obstructions such as reflection, glare, fences, raindrops and dirt.

The systems and methods described may utilize motion parallax to determine a different motion pattern of the scene, or background, layer and the obstruction, or foreground, layer while moving the camera. As such, a scene layer may be separated from the obstruction layer in image frames where they may be mixed.

The methods described herein may be applied to a plurality of still images (e.g., captured via a still frame DSLR or single frame capture mode of a mobile device) and/or to a plurality of video images (e.g., captured via a video camera or video capture mode of a mobile device). Furthermore, systems and methods may involve a single camera or multiple cameras (e.g., stereoscopic or other multiscopic imaging systems).

Additionally or alternatively, systems and methods described herein may be applied within the context of digitally archiving photographic prints. That is, glossy, or even matte, finishes on some photographic prints may result in severely degraded images of the object print as-captured by a conventional camera. For example, the as-captured images may include bright, blown-out streaks, which may be undesirable. Systems and methods herein may substantially eliminate or mitigate the undesirable elements by processing a plurality of images of the object print captured from a variety of different camera angles/locations with respect to the object print.

In such a scenario, the bright reflection can be described as originating from a different virtual plane than the main object print. As such, when the capture position of the camera is moved, the reflection may move to a different location on the object print, or may be removed from the object print altogether. As described herein, an imaging system, such as a smartphone, may be configured to provide, via a display, instructions for a user to capture an initial image and a plurality of further images from different capture positions with respect to the object print. For example, the instructions may be similar to those directing a user to capture a panoramic image.

In response to receiving information that the imaging system is moving to the different respective capture positions, or close approximations thereof, a plurality of further images may captured. Based on the plurality of captured images (both initial images and further images), image processing may be automatically carried out to provide a background image that does not include the reflection. As such, the background image may provide a higher quality digitization of the object print as compared to conventional techniques.

II. Example Systems

FIG. 1 illustrates a schematic diagram of a system 100, according to an example embodiment. The system 100 includes a camera 110, a display 120, a user interface 130, a positioning system 140, and a controller 150. In an example embodiment, the system 100 may be incorporated into a mobile device (e.g., a smartphone, a laptop, or a tablet), a digital camera (e.g., a digital single lens reflex (DSLR) camera), or another type of imaging system.

The camera 110 may include one or more image sensors configured to capture images of a field of view of an environment of the system 100. The camera 110 may additionally include one or more optical elements, such as lenses, polarizers, or filters. The optical elements may be placed along the optical axis and may be configured to adjust one or more aspects of light incident into the camera 110. For example, the optical elements may be configured to focus the light onto a focal plane with respect to the one or more image sensors.

The display 120 may include a device configured to provide visual information to a user of the system 100. Namely, display 120 may include a screen with a plurality of pixel elements. The pixel elements may include a plurality of light emitting diodes (LED), thin film transistors (TFT) or another type of image pixel technology. In some embodiments, display 120 may be incorporated into a touchscreen, which may in turn be considered as an element of user interface 130.

The user interface 130 may include various ways for a user to interact with one or more aspects of system 100. For example, the user interface 130 may include one or more buttons, switches, touchpads, displays or indicators. In such a scenario, a user may press a button or a touchpad of system 100 so as to adjust a mode of operation of the system 100. For example, the user interface 130 may be configured to accept input from a user so as to adjust from a first mode of operation (e.g., standard photography mode) to a second mode of operations (e.g., an obstructed scene photography mode). Furthermore, a user may be able to control, via the user interface 130 an automation level of switching the mode of operation. For instance, the user interface 130 may include an option to manually switch to (and out of) the obstructed scene photography mode. Additionally or alternatively, the user interface 130 may include an option to automatically determine whether to switch from the first mode of operation to the second mode of operations based, for example, on one or more images of the field of view.

The positioning system 140 may be configured to provide information to the controller 150 regarding a position of the system 100 and/or the camera 110. In such a scenario, the positioning system 140 may include an inertial measurement unit (IMU) and/or a global positioning system (GPS). In an example embodiment, the positioning system 140 may provide the information about the position of the system 100 based on an RF and/or WiFi triangulation method. In an embodiment, the positioning system 140 may be configured to determine a pose (e.g., a position and an orientation) of system 100 and/or camera 110. That is, the positioning system 140 may provide, to the controller 150, information indicative of the camera pose as well as movements resulting in changes to the camera pose. Other types of positioning systems are possible.

Controller 150 may include at least one processor 152 and a memory 154. The memory 154 may include a non-transitory computer readable medium. Namely, the memory 154 may include read-only memory (ROM), random access memory (RAM), a floppy disk drive, a hard disk drive, a solid state drive (SSD), or another type of memory element configured to store information. The processor 152 may be configured to execute program instructions stored in memory 154 so as to carry out various operations described herein.

In an example embodiment, the operations may include causing the camera 110 to capture an initial image of the field of view from an initial camera pose. Additionally or alternatively a plurality of initial images may be captured from various camera poses, which may provide an indication that one or more obstructions are present with the field of view. That is, a natural motion of a hand-held camera (or smartphone) may provide sufficient movement so as to determine that an obstruction is present in the field of view.

As such, the operations may include determining that an obstruction is observable in the field of view. In one embodiment, a user of the system 100 may affirmatively select an "obstruction removal" mode (e.g., via a button or dial). In other embodiments, the system 100 may automatically detect the presence of obstructions and carry out other operations described herein.

The operations may also include determining, based on the obstruction, at least one desired camera pose. In such a scenario, the at least one desired camera pose may include at least one desired position of the camera 110 and/or at least one desired orientation of the camera 110.

The operations may additionally include causing the display to provide a capture interface. As such, the capture interface may include instructions corresponding to moving the camera to the at least one desired camera pose. In some embodiments, the display may provide visual representations of instructions superimposed on the field of view. As a non-limiting example, the instructions may include circles, arrows, colored regions, shaded regions, or other types of visual representations that may provide users of the system 100 with information about how to move the camera 110 to the desired camera pose(s).

The operations also include causing the camera to capture at least one further image of the field of view. In an example embodiment, the at least one further image may be captured from the at least one desired camera pose. That is, the operations may optionally include determining that a current camera pose corresponds to at least one desired camera pose. As an example, the controller 150 may receive information indicative of the current camera pose via the positioning system 140. In such a scenario, the at least one further image of the field of view may be captured in response to determining that the current camera pose corresponds to the at least one desired camera pose.

The operations further include processing the captured images to provide at least one background image of the field of view. According to the methods and systems described herein, at least a portion of the obstruction is not present in the background image.

Figure 2:
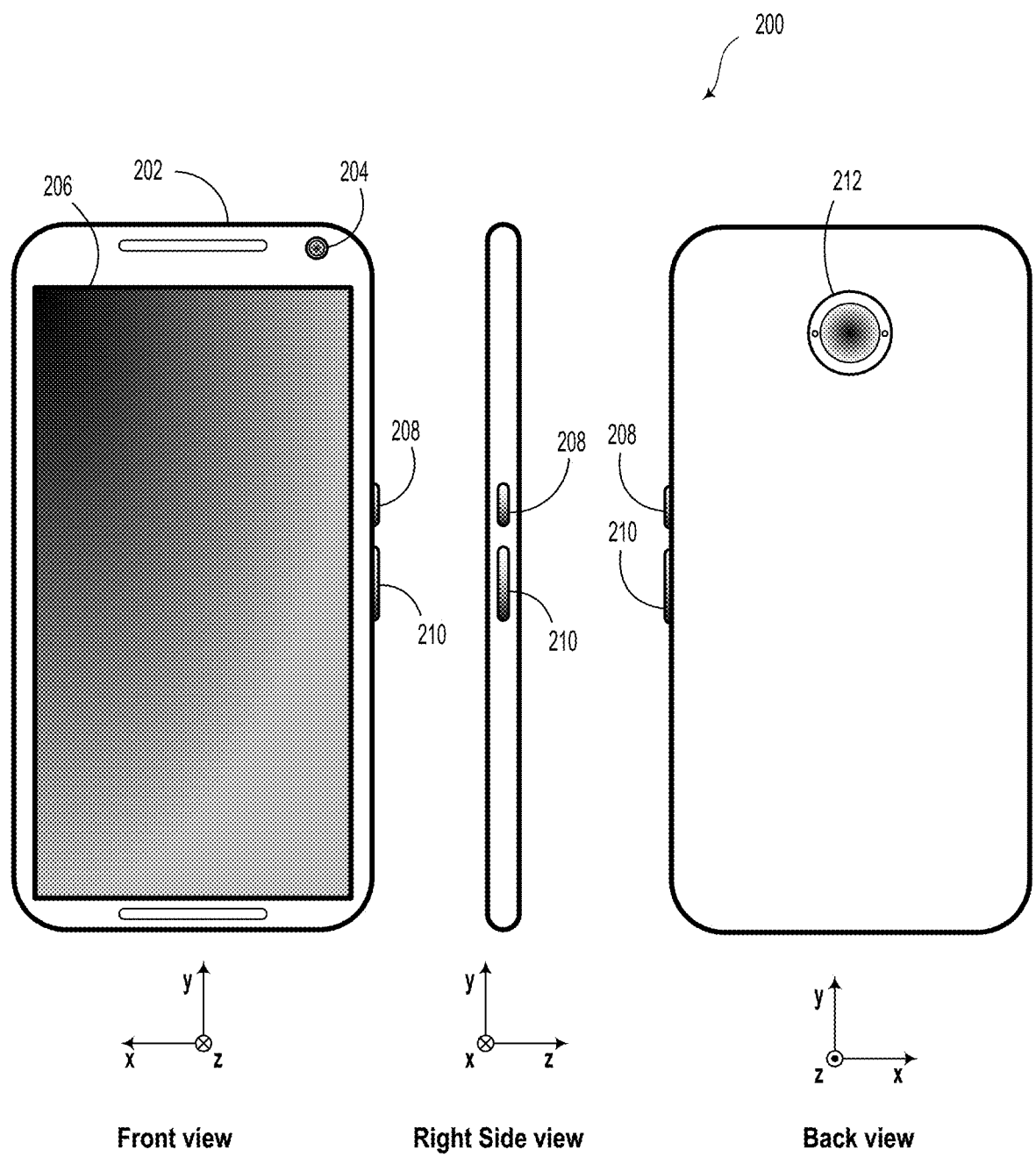
FIG. 2 illustrates an image capture system, according to an example embodiment.

FIG. 2 illustrates an image capture system 200, according to an example embodiment. The image capture system 200 may be similar or identical to a mobile device, such as a smartphone. The image capture system 200 may include similar or identical elements as those of system 100, as illustrated and described in relation to FIG. 1. Other types of image capture systems 200 are contemplated.

The image capture system 200 may include a body 202, a front-facing camera 204, a display 206, a first softkey 208, and a second softkey 210. The image capture system 200 may further include a rear-facing camera 212. While image capture system 200 is illustrated as having single front- and rear-facing cameras, multiscopic camera arrangements are possible. That is, image capture system 200 may include stereoscopic cameras on one or more surfaces of the image capture system 200.

Figure 3A:
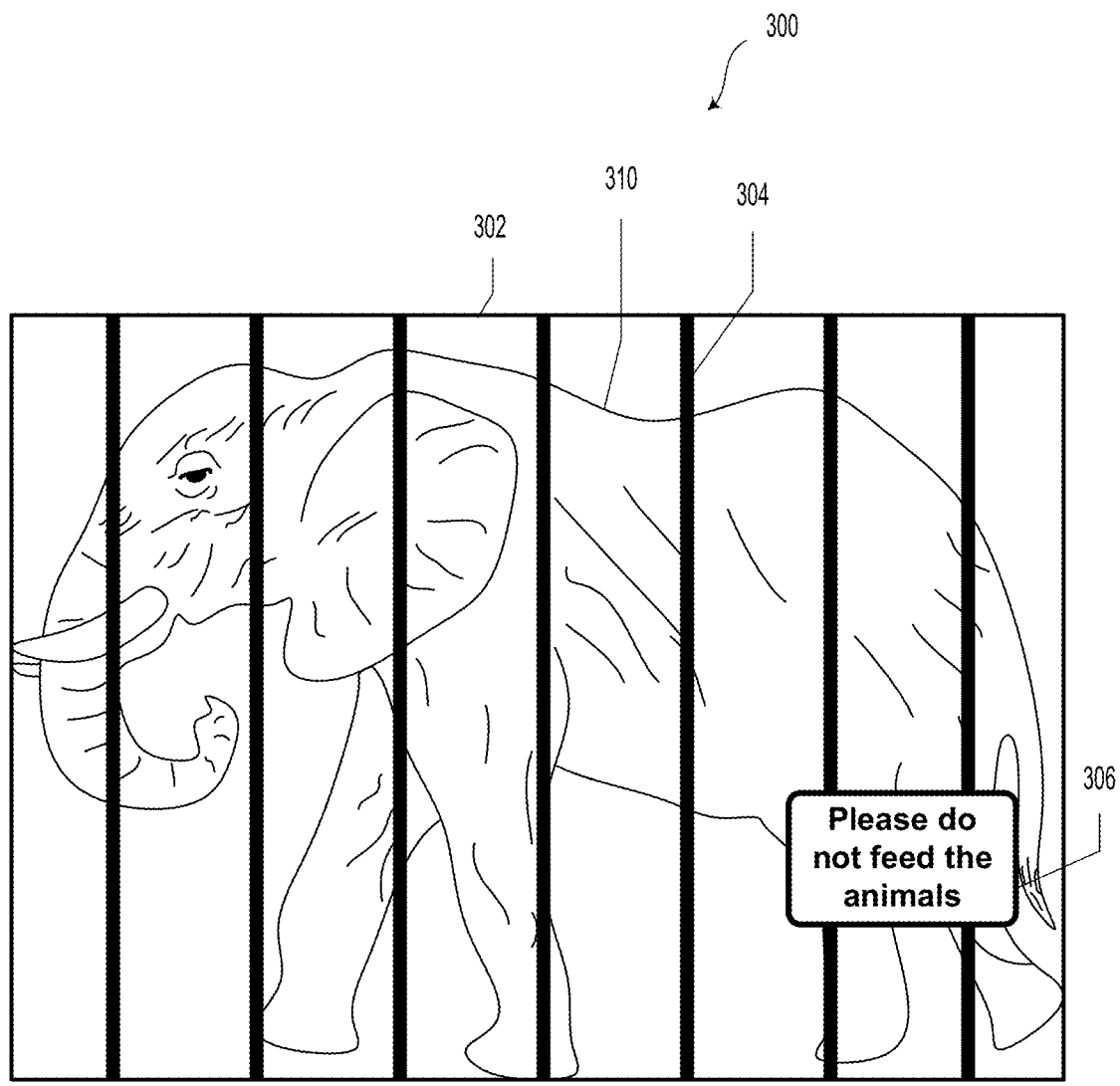
FIG. 3A illustrates an image capture scenario, according to an example embodiment.

FIG. 3A illustrates an image capture scenario 300, according to an example embodiment. Namely, image capture scenario 300 may include a field of view 302 that includes a foreground obstruction 304 (e.g., bars of an elephant enclosure). The image capture scenario 300 may include a sign 306 that may be arranged in the foreground. An elephant 310 may be located behind the foreground obstruction 304.

In such a scenario, it may be desirable to capture images using an image capture system, such as image capture system 200 as illustrated and described with respect to FIG. 2, that do not include the distracting and unattractive foreground obstruction 304. In an example embodiment, the image capture system may automatically detect the presence of foreground obstruction 304. Additionally or alternatively, a user may adjust a mode of operation to initiate "obstructed scene photography mode."

Figure 3B:
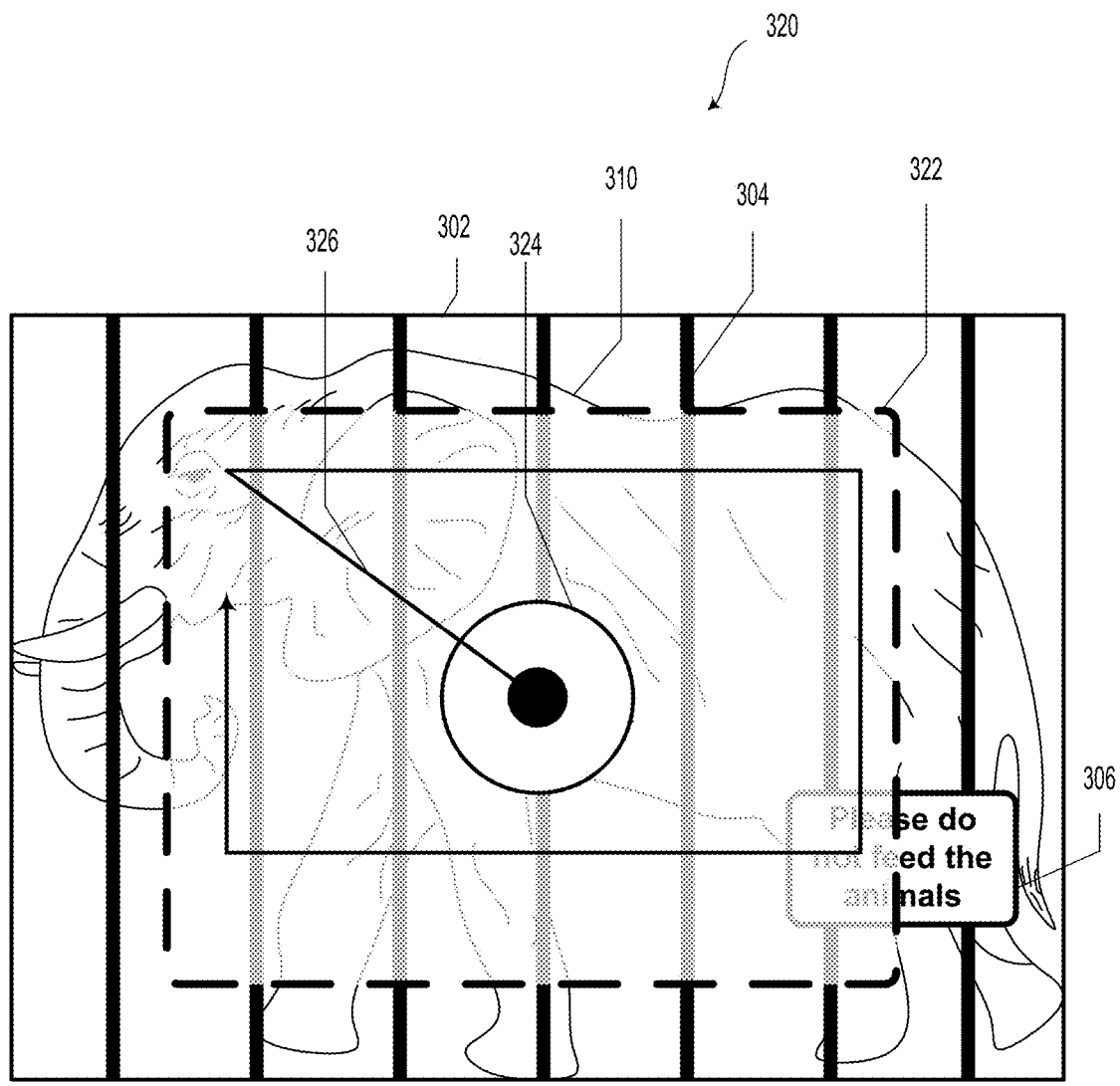
FIG. 3B illustrates an image capture scenario, according to an example embodiment.

FIG. 3B illustrates an image capture scenario 320, according to an example embodiment. Upon entering obstructed scene photography mode, the image capture system may present, via a display, information indicative of a desired camera pose or poses. Such information may be part of a capture interface. That is, the information on the display may indicate in words, numbers, symbols, or via other indications, that the image capture system/camera should move to the desired camera pose. As described herein, the desired camera pose may include a position and a pointing orientation of the image capture system.

As an example, image capture scenario 320 illustrates a movement region 322 being presented as an overlay on top of a live view representation of the elephant scene as described in FIG. 3A. In some embodiments, as illustrated, the overlaid movement region may include a translucent or semi-transparent overlay. The overlaid movement region 322 may include a current camera pose indication 324 and a desired camera path 326, which may correspond to a plurality of desired camera poses (e.g., camera orientations and/or camera locations). In an example embodiment, the image capture system may be configured to capture images responsive to the camera pose being at least one of the set of desired camera poses. As such, the capture interface may provide visual guidance for a user to move the image capture system such that a sufficient number of images may be captured from a sufficient set of camera poses according to the algorithms set forth herein.

During or after images of the scene are captured at the desired camera poses, various image processing, manipulation, and filtering methods may be carried out on the plurality of captured images. Namely, such methods may include selecting a plurality of sampling frames from the captured images, aligning the plurality of sampling frames, and filtering the plurality of sampling frames so as to remove at least a portion of the obstruction and provide a background image frame. In other words, the background image frame may include a representation of the field of view that may appear as though the obstruction is not actually in the field of view.

Aligning the plurality of sampling frames may be performed according to at least one of: an edge detection method, a corner detection method, a feature matching method, a homography fitting method, or a motion field detection method.

Once aligned, the background-registered frames may be filtered by per-pixel comparisons between frames. In an example embodiment, the pixel with a minimum value (e.g., luminance or intensity) may be selected for incorporation into a processed frame. For example, if the plurality of sampling frames includes ten frames, ten pixels (one from each frame) may be compared to each other. Using a minimum intensity standard, the pixel with the lowest intensity may be selected for incorporation into one or more processed frames. Additionally or alternatively, filtering the plurality of sampling frames may be performed according to a per-pixel median filtering method. Other ways to filter the pixels from the sampling frames are possible and contemplated herein.

Processing the captured images may include equalizing color and brightness of the plurality of sampling frames.

In some embodiments, the system may be configured to determine a type of the obstruction. Furthermore, the at least one desired camera pose may be based on the type of obstruction. For instance, the type of the obstruction may include at least one of: an occluding object, a specular reflection, or a direct reflection. As an example, if the occluding objects include a set of vertical bars, the desired camera pose(s) may be determined to include various camera positions along a horizontal axis with respect to the vertical bars. Other examples are possible.

In an example embodiment, the instructions of the capture interface include visual representations, displayed via the display, of a plurality of spatial locations corresponding to a plurality of desired camera poses. That is, the visual output from the display may include dots, lines, circles, and/or other shapes or indicators that may help provide guidance to a user as to where to move the system.

In an example embodiment, the display may provide a live view representation of the field of view. For instance, the display may show the field of view being captured by a given camera of the system. The display may also provide information indicative of a current camera pose, that is, a current camera location and/or orientation. The display may additionally or alternatively provide information indicative of the at least one desired camera pose. That is, the display may provide a graphical representation of the orientation or location of the camera.

Furthermore, after image processing, the display may provide a representation of the background image.

Figure 3C:
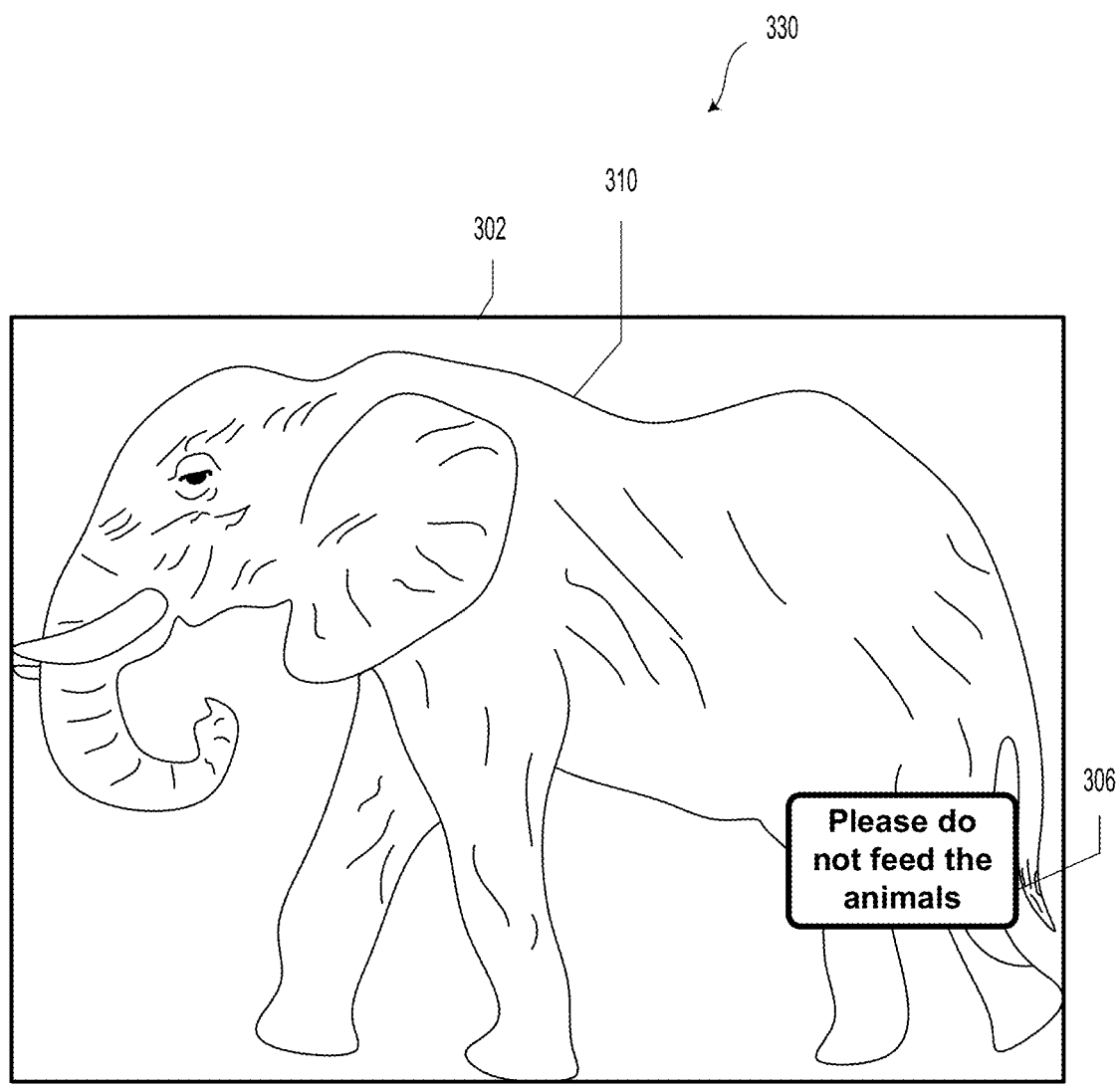
FIG. 3C illustrates an image capture scenario, according to an example embodiment.

FIG. 3C illustrates an image capture scenario 330, according to an example embodiment. Image capture scenario 330 may represent a processed background frame with the foreground obstruction removed. In some embodiments, some foreground elements need not be removed. For example, if a foreground region is sufficiently large, the algorithms herein need not remove it from the background image frame. As an example, the sign 306 may remain in the processed background image frame.

III. Example Methods

Figure 4:
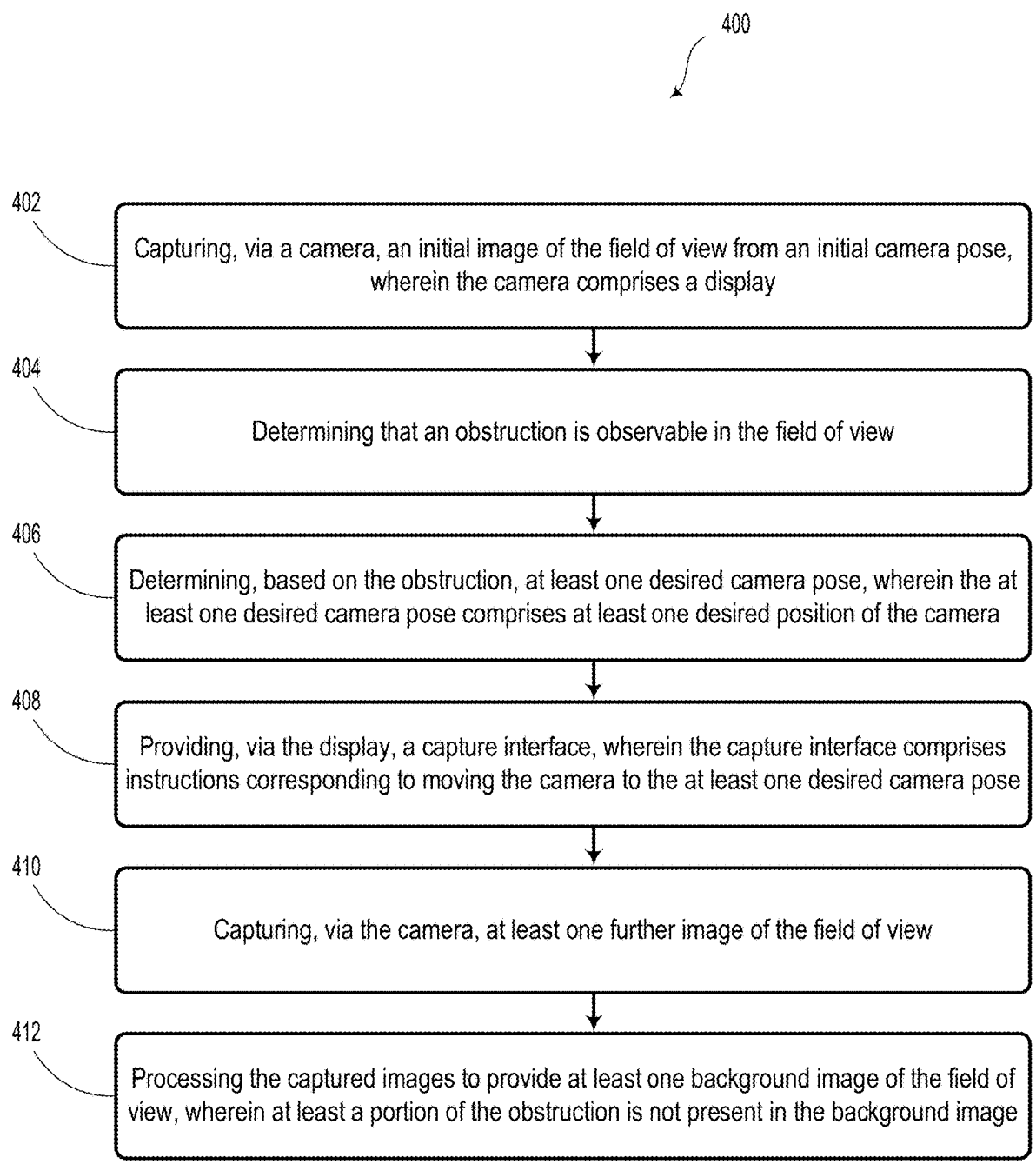
FIG. 4 illustrates a method, according to an example embodiment.

FIG. 4 illustrates a method 400, according to an example embodiment. The method 400 may include various blocks or steps. The blocks or steps may be carried out individually or in combination. The blocks or steps may be carried out in any order and/or in series or in parallel. Further, blocks or steps may be omitted from or added to method 400.

Some or all blocks of method 400 may involve elements of system 100 or image capture system 200, as illustrated and described in reference to FIGS. 1 and 2. Furthermore, some blocks of method 400 may involve various imaging scenarios, such as those illustrated and described with regard to FIGS. 3A, 3B, and 3C. Some or all blocks of method 400 may be carried out by controller 150, in association with processor 152 and memory 154.

Block 402 includes capturing, via a camera, an initial image of the field of view from an initial camera pose. In such a scenario, the camera may include a display.

Block 404 includes determining that an obstruction is observable in the field of view. In some embodiments, several initial images may be captured so as to provide information with which to determine whether an obstruction is present in the field of view. In an example embodiment, a natural motion of a hand-held camera may provide sufficient movement to determine whether the field of view includes, for example, bars of an enclosure or a glass window surface.

Block 406 includes determining, based on the obstruction, at least one desired camera pose. The at least one desired camera pose includes at least one desired position of the camera.

In an example embodiment, the method may include determining that a current camera pose corresponds to at least one desired camera pose. That is, causing the camera to capture the at least one further image of the field of view is responsive to determining that the current camera pose corresponds to the at least one desired camera pose.

Block 408 includes providing, via the display, a capture interface. The capture interface includes instructions corresponding to moving the camera to the at least one desired camera pose. The instructions of the capture interface include visual representations, provided by the display, of a plurality of spatial locations corresponding to a plurality of desired camera poses.

The capture interface further includes a display and a live view representation of the field of view. The capture interface also may include information indicative of a current camera pose and may also provide information indicative of at least one desired camera pose.

Block 410 includes capturing, via the camera, at least one further image of the field of view. As an example, the at least one further image of the field of view may be captured from the at least one desired camera pose.

Block 412 includes processing the captured images to provide at least one background image of the field of view. The at least a portion of the obstruction is removed from the background image. In an example embodiment, the method may include providing, via the display, a representation of the background image.

In an example embodiment, processing the captured images includes selecting a plurality of sampling frames from the captured images, aligning the plurality of sampling frames, and filtering the plurality of sampling frames so as to remove at least a portion of the obstruction and provide the background image frame.

Aligning the plurality of sampling frames may be performed according to at least one of: an edge detection method, a corner detection method, a feature matching method, a homography fitting method, or a motion field detection method. Filtering the plurality of sampling frames may be performed according to a per-pixel minimum or median filtering method. Processing the captured images may further include equalizing color and brightness of the plurality of sampling frames.

In some embodiments, the method may include determining a type of the obstruction. For example, determining the at least one desired camera pose may be based on the type of obstruction. In a non-limiting set, the type of the obstruction may include at least one of: an occluding object, a specular reflection, or a direct reflection.

IV. Example Image Capture Scenarios

Many image capture scenarios may include taking photos of the scene through visual obstructions. For example, at the top floor of a skyscraper in a major city, a camera user may want to take a photo of the beautiful city at night. However, windows, for safety and comfort reasons, may be present between the camera and the night scene. In such a scenario, the reflection of the bright indoor scene can be very difficult to remove no matter how the photographer poses the camera (e.g., moving the camera to various positions or orientations).

Another example includes taking pictures in a zoo. While strong and tight fences are important to protect visitors from wild animals, such as tigers, it may be desirable to take a full picture of the tiger without any fences in the captured image. Furthermore, it may be desirable to take a selfie (e.g., capturing an image that visually incorporates the photographer) with a wild animal as if the fences were not there.

Figure 5:
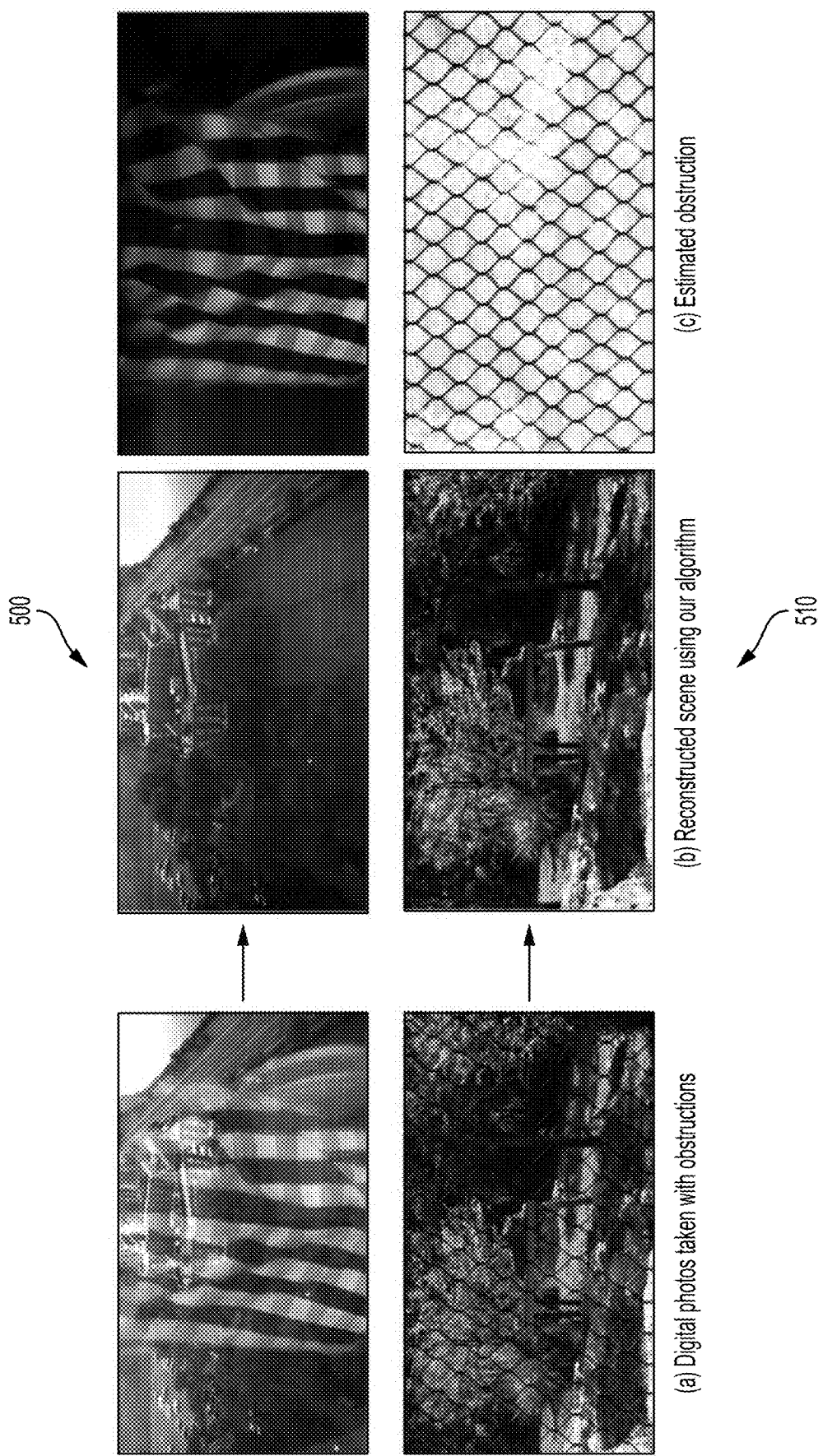
FIG. 5 illustrates two image capture scenarios, according to example embodiments.

FIG. 5 illustrates two image capture scenarios 500 and 510, according to example embodiments. In the first scenario 500, along the top row, an image is captured through a foreground window toward a background building and grounds. As shown in the upper left image, the captured image includes an obstruction which may be characterized as a reflection of a plaid shirt. A plurality of images may be captured from various camera poses with the background building and grounds in the respective fields of view. According to the methods described herein, the plurality of captured images may be reconstructed so as to remove the reflected portion. Additionally or alternatively, the reflection may be extracted separately for further analysis or processing.

In the second scenario 510, along the bottom row, a field of view may include a wild animal (e.g., a tiger) in an enclosure. A captured image may include obstructions, which may be characterized as a chain-link fence. If several images are captured from a plurality of camera poses, it may be possible to remove the appearance of the chain-link fence. As such, a reconstructed scene may include a representation of the field of view without the obstructing fence. In some embodiments, the chain link fence layer may be extracted and analyzed or processed separately.

Figure 6:
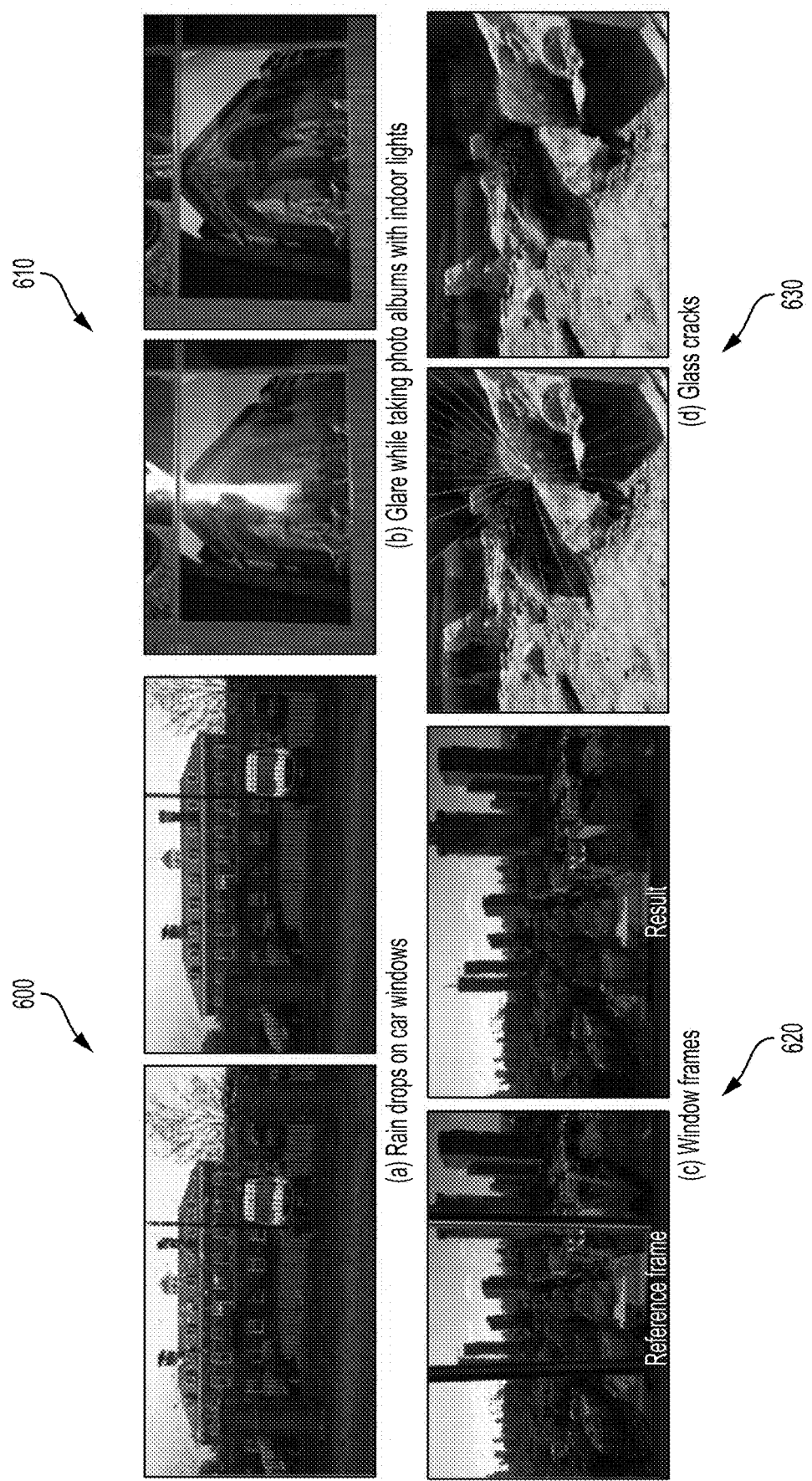
FIG. 6 illustrates four image capture scenarios, according to example embodiments.

Many other obstruction removal scenarios are possible. FIG. 6 illustrates four image capture scenarios 600, 610, 620, and 630, according to example embodiments. The image capture scenarios may involve several different types of obstructions. For example, the obstructions may include rain drops on a car window (600). That is, on a rainy day, one may want to take photos through car windows occupied by rain drops. Obstructions may include glare while capturing images of a photo album with overhead light (610). As such, glare may obscure photo content of the photo album. In another example, window frame elements (620), and cracked glass (630) may be present when capturing images through a window. Other types of obstructions are possible.

The systems described herein may be configured to remove these unwanted, unpleasant obstructions in digital photos to recover content that is more visually pleasing. Removing these visual obstructions automatically from a single image may be performed if a user or a machine moves the camera. In such a scenario, the scene (the image content that is behind the obstruction) layer and the obstruction layer undergo different image motion. For opaque obstructions, it is possible that all the pixels in the scene layer are visible in the frames of the camera moving sequence. For transparent or translucent obstructions such as reflections, pixels may be added with different values in each frame and sometimes their relative contribution to the overall image may be small.

In other words, the present disclosure may utilize the motion parallax of the scene and obstruction layers to remove obstruction from the image sequence for scene reconstruction.

As used herein, the term "scene" and "background" are interchangeable for portions of the image that are behind or underneath the obstruction. In some embodiments, the obstruction may be referred to as "reflection" or "foreground" depending on the context.

Because the current system and method is based on movement of the camera, both the scene and the obstruction layers may move with respect to one another in the video sequence being captured. In an example embodiment, the separation problem may be made easier if the scene layer is fixed (does not move), and/or the obstruction layer is fixed. This can be achieved through warping the frames to a reference frame according to flow fields estimated by some robust motion analysis algorithms.

The present system and method utilize motion analysis algorithms to analyze pixel motions in the presence of an obstruction. Once the motion is known, the system may attempt to separate the obstruction layer from the scene. For transparent reflections, an estimate of both the obstruction and the scene may be important for more reliable reconstruction. For opaque and sparse obstructions such as fences, raindrops and glares, it may be sufficient to estimate the scene layer while treating obstructions as outliers. As such, some simple operations such as filtering according to minimum and/or maximum luminance value can be very effective in removing glare-like obstructions.

To remove transparent obstructions such as reflections, multiple iterations between motion estimation and image reconstruction may be performed. In such a scenario, motion estimation is done between the reconstructed scene/obstruction layers and the captured frames. In an example embodiment, while image reconstruction relies on registration from motion estimation analysis, the present system is able to iterate between these two steps and produce visually pleasing results.

Figure 7:
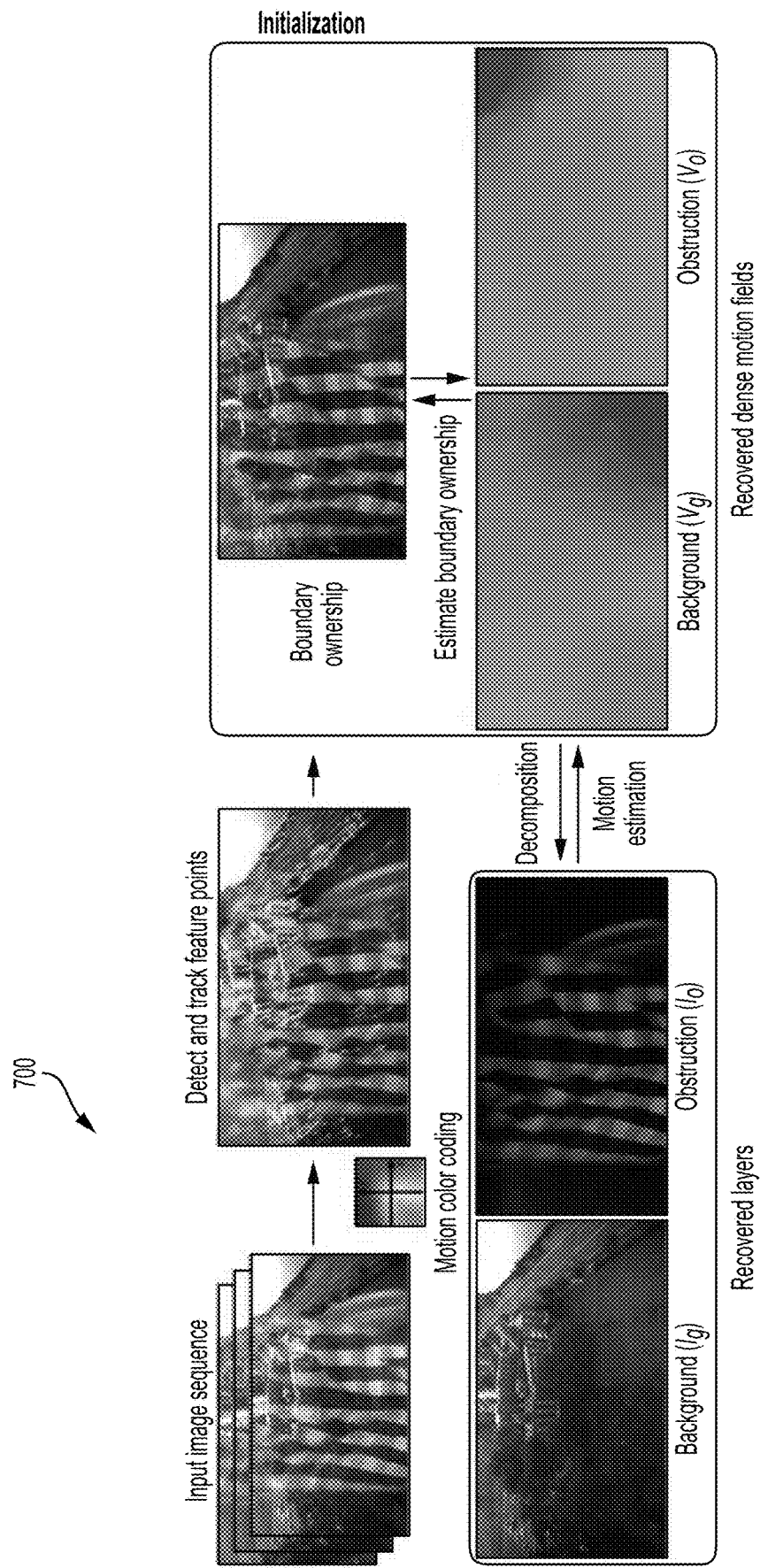
FIG. 7 illustrates an obstruction removal process, according to example embodiments.
Figure 8:
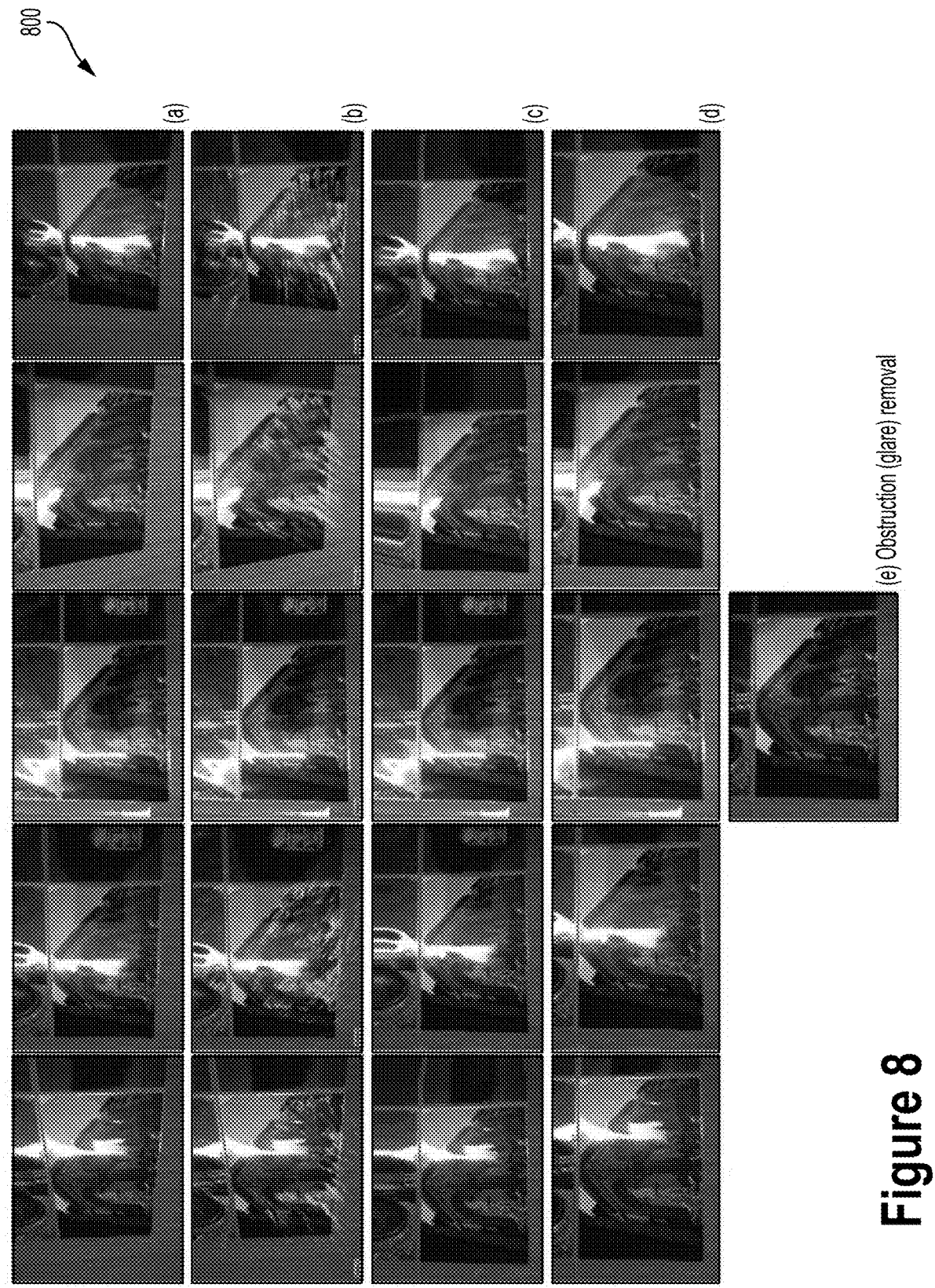
FIG. 8 illustrates an obstruction removal process, according to example embodiments.

Two systems for obstruction removal are described herein. The first system is a full deobstruction method where the motion and appearances of both the scene and obstruction layers are estimated and reconstructed as shown in FIG. 7. FIG. 7 illustrates an obstruction removal process 700, according to example embodiments. The second system is a "lite" deobstruction method where only the motion and appearances of the scene layers are modeled and estimated, while the obstruction layer is simply treated as outlier, as shown in FIG. 8. FIG. 8 illustrates an obstruction removal process 800, according to example embodiments.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
a camera configured to capture images;
a display; and
a controller comprising at least one processor and a memory, wherein the processor executes program instructions stored in the memory so as to carry out operations, the operations comprising:
receiving an initial image of a scene captured by a camera at an initial camera pose;
detecting an obstruction is observable in the initial image of the scene;
responsive to detecting the obstruction, displaying instructions corresponding to moving the camera to at least one desired camera pose, wherein the at least one desired camera pose provides for capture of at least one secondary image having at least one field of view of the scene that is useable by an obstruction-removal procedure, in combination with the initial image, as basis to generate an output image of the scene in which at least a portion of the obstruction is not present;
receiving the at least one secondary image that is captured in accordance with the instructions; and
engaging in the obstruction-removal procedure to generate the output image.

2. The system of claim 1, wherein the at least one desired camera pose is different from the initial camera pose.

3. The system of claim 1, wherein the operations further comprise determining that a current camera pose corresponds to the at least one desired camera pose, and responsively causing the camera to capture the at least one secondary image that corresponds to the at least one desired camera pose.

4. The system of claim 1, wherein engaging in the obstruction-removal procedure comprises:
selecting a plurality of sampling frames from among the initial image and the at least one secondary image;
aligning the plurality of sampling frames; and
filtering the plurality of sampling frames so as to remove at least the portion of the obstruction and provide the output image.

5. The system of claim 4, wherein aligning the plurality of sampling frames is performed according to at least one of: an edge detection method, a corner detection method, a feature matching method, a homography fitting method, or a motion field detection method.

6. The system of claim 4, wherein filtering the plurality of sampling frames is performed according to at least one of a per-pixel minimum filtering method or a per-pixel median filtering method.

7. The system of claim 4, wherein engaging in the obstruction-removal procedure further comprises equalizing color and brightness of the plurality of sampling frames.

8. The system of claim 1, wherein the operations further comprise:
determining a type of the obstruction; and
determining the at least one desired camera pose based on the type of obstruction.

9. The system of claim 8, wherein the type of the obstruction comprises at least one of: an occluding object, a specular reflection, or a direct reflection.

10. The system of claim 1, wherein the instructions comprise a visual representation, displayed via the display, of at least one spatial location corresponding to the at least one desired camera pose.

11. The system of claim 1, further comprising causing the display to provide a capture interface comprising the instructions, wherein causing the display to provide the capture interface comprises:
causing the display to provide a live view representation of a field of view of the camera;
causing the display to provide information indicative of a current camera pose; and
causing the display to provide information indicative of the at least one desired camera pose.

12. The system of claim 1, wherein the operations further comprise causing the display to provide a representation of the output image via a capture interface.

13. A method comprising:
receiving an initial image of a scene captured from an initial camera pose of a camera, wherein the camera comprises or is communicatively coupled to a display device;
detecting an obstruction in the initial image of the scene;
responsive to detecting the obstruction, displaying instructions corresponding to moving the camera to at least one desired camera pose, wherein the at least one desired camera pose provides for capture of at least one secondary image having at least one field of view of the scene that is useable by an obstruction-removal procedure, in combination with the initial image, as basis to generate an output image of the scene in which at least a portion of the obstruction is not present;
receiving the at least one secondary image that is captured in accordance with the instructions; and
engaging in the obstruction-removal procedure to generate the output image.

14. The method of claim 13, further comprising determining that a current camera pose corresponds to the at least one desired camera pose, and responsively causing the camera to capture the at least one secondary image that corresponds to the at least one desired camera pose.

15. The method of claim 13, wherein engaging in the obstruction-removal procedure comprises:

selecting a plurality of sampling frames from among the initial image and the at least one secondary image;

aligning the plurality of sampling frames; and filtering the plurality of sampling frames so as to remove at least the portion of the obstruction and provide the output image.

16. The method of claim 15, wherein aligning the plurality of sampling frames is performed according to at least one of: an edge detection method, a corner detection method, a feature matching method, a homography fitting method, or a motion field detection method.

17. The method of claim 15, wherein filtering the plurality of sampling frames is performed according to at least one of a per-pixel minimum filtering method or a per-pixel median filtering method.

18. The method of claim 15, wherein engaging in the obstruction-removal procedure further comprises equalizing color and brightness of the plurality of sampling frames.

19. The method of claim 13, further comprising:

determining a type of the obstruction; and determining the at least one desired camera pose based on the type of obstruction.

20. The method of claim 19, wherein the type of the obstruction comprises at least one of: an occluding object, a specular reflection, or a direct reflection.

* * * * *